(12) United States Patent
Netravali et al.

(10) Patent No.: US 7,474,629 B2
(45) Date of Patent: Jan. 6, 2009

(54) SCALABLE METHODS AND DEVICES FOR COMPUTING ROUTING PATHS WITHIN THE INTERNET

(75) Inventors: Arun Narayan Netravali, Westfield, NJ (US); Krishan Kumar Sabnani, Westfield, NJ (US); Ramesh Viswanathan, Manalapan, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 772 days.

(21) Appl. No.: 10/953,559

(22) Filed: Sep. 30, 2004

(65) Prior Publication Data

US 2006/0067248 A1 Mar. 30, 2006

(51) Int. Cl.
*H04L 12/28* (2006.01)

(52) U.S. Cl. .................................. 370/254; 370/252
(58) Field of Classification Search .................. None
See application file for complete search history.

(56) References Cited

U.S. PATENT DOCUMENTS

| 6,930,984 | B1 * | 8/2005 | Nomura et al. ............. 370/254 |
| 6,982,960 | B2 * | 1/2006 | Lee et al. .................. 370/254 |
| 7,139,242 | B2 * | 11/2006 | Bays ....................... 370/238 |
| 7,277,393 | B1 * | 10/2007 | Jacobson et al. ............ 370/238 |
| 2003/0152092 | A1 * | 8/2003 | Lu .......................... 370/408 |
| 2004/0125795 | A1 * | 7/2004 | Corson et al. ............... 370/356 |
| 2005/0047413 | A1 * | 3/2005 | Ilnicki et al. ............... 370/392 |
| 2005/0078610 | A1 * | 4/2005 | Previdi et al. ............... 370/254 |

* cited by examiner

*Primary Examiner*—Phirin Sam

(57) ABSTRACT

Routing-related scalability problems associated with the growth of the Internet are solved by assigning topologically encoded Internet addresses to each node within a network.

16 Claims, 3 Drawing Sheets

SCALABLE METHODS AND DEVICES FOR COMPUTING ROUTING PATHS WITHIN THE INTERNET

BACKGROUND OF THE INVENTION

As the size of the Internet grows larger and larger, problems associated with routing information from one location to another get more and more complex. For example, each time a new node is added to the Internet, so-called Border Gateway Protocol (BGP) routers must modify their stored routing tables. In addition, if one BGP router elects to select a new path to route information, this change has a cascading effect on its surrounding neighbors (e.g., other BGP routers), requiring them to also update their routing tables. Until every affected BGP router has so updated its forwarding tables, it may be difficult to route information through a so-affected BGP router. When all of the so-affected BGP routers have completed their updates, the network is said to have "converged."

The greater the number of changes to the Internet, the longer it takes a network to converge. It is expected that as the Internet grows, the problem of convergence, i.e., the length of time it takes a network to converge, will grow larger and larger.

The growth of the Internet is also the cause of a related problem. As the number of nodes in the Internet grows larger and larger, the number of routing-related messages, and the length of each message, needed to be exchanged between two given routers grows larger and larger as well. That is, because conventional Internet addresses do not contain information about the geographic location of a given node, BGP routers must exchange messages to compute routing paths. As the Internet gets larger and larger, without geographical information routers will have to exchange an increasing number of routing messages and each message will have to contain an increasing amount of routing information to be able to compute routing paths.

In sum, it can be said that the existing methods of computing routes or paths are not easily "scalable"; that is, though it may work for a certain size network, it may not work very well at all for a very large network.

In contrast, conventional telephony networks have not encountered such problems, in part, due to their use of a protocol known as Signaling System 7 (SS7). SS7 has proven to be very robust and scalable. One aspect of SS7 which allows it to be scalable is the fact that the address (e.g., telephone number) of a given node represents encoded geographical information. This allows routing paths to be computed based on the telephone numbers themselves rather than based on the exchange of routing messages.

It is, therefore, desirable to provide for methods and devices which allow for highly scalable Internet routing akin to SS7.

It is further desirable to provide for methods and devices that allow highly scalable Internet routing by encoding geographical-like routing information within an Internet address.

SUMMARY OF THE INVENTION

We have recognized that scalability problems related to the growth of the Internet may be overcome by using methods and devices which assign geographical or topological (collectively "topological" or "topologically") encoded Internet addresses to nodes within the Internet. The use of topologically encoded Internet addresses allows routing paths to be computed faster than previously thought possible even as the Internet grows larger and larger.

In accordance with one aspect of the present invention, one or more identified nodes of a network are each assigned a topologically encoded Internet address such that any two nodes may be determined to be adjacent within a time period ("adjacency time") that is proportional to the so-assigned addresses. In addition, each of the addresses consists of a length that is at most k log n bits, where "k" is a constant and is independent of a network's size, and "n" is the number of nodes in the network (i.e., network size).

Because the length of each address is proportional to the logarithm (log n) of the size of the network, and there is a relationship between adjacency time and address length, the present invention makes it possible to determine whether nodes are adjacent within a time period proportional to the logarithm of the size of the network (log n); a period time far shorter than is possible using conventional techniques.

Shorter adjacency times make it possible to compute routing paths faster because a path's computation can be viewed as being made up of a number of adjacency time computations.

In another aspect of the present invention, the topologically encoded Internet addresses can be used by devices, such as routers and the like, to route information from one node to another.

DETAILED DESCRIPTION OF THE INVENTION

Figure 1:
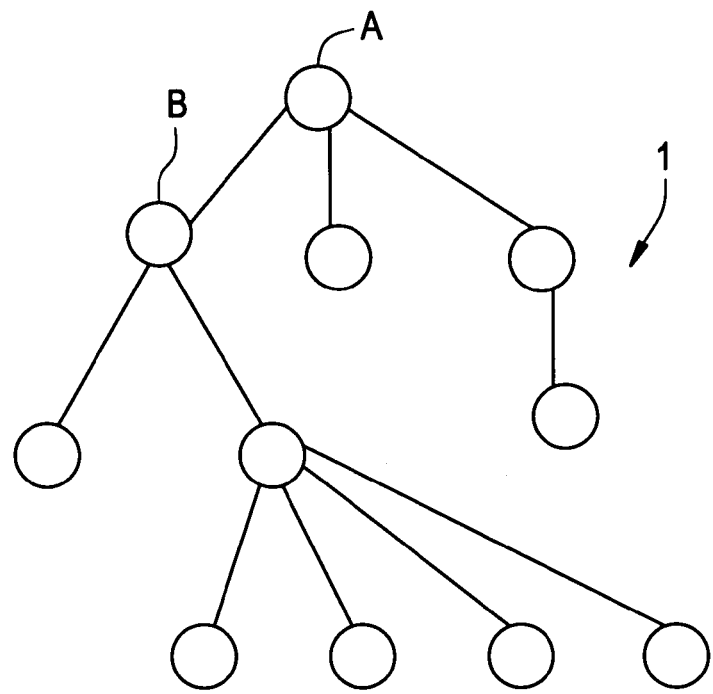
FIG. 1 depicts a network of nodes that have not previously been assigned Internet addresses.

Referring to FIG. 1, there is depicted a simplified diagram of nodes (represented by circles) within a network 1 which is itself a part of the Internet. For present purposes it will be assumed that each of the nodes within network 1 has not yet been assigned an Internet address. In one embodiment of the present invention, a node within network 1 is identified and assigned a topologically encoded Internet address as described further below (see FIG. 3). This topologically encoded Internet address contains topological or similar information which, in general, uniquely identifies it among all other nodes within network 1 and within the entire Internet. Similarly, each node within network 1 is assigned a topologically encoded Internet address.

In a further embodiment of the present invention, each topologically encoded address may comprise a maximum of k log n bits, where "k" is a constant and is independent of the size of a network and "n" is the number of nodes in the network. It should be understood that by "log n", is meant the logarithm (base 2) of "n" nodes. For example, if network 1 is comprised of 16 nodes (i.e., n=16), then each node would comprise an address made up of at most 4 bits because the log base 2 of 16 is 4. Similarly, if n=32, then each node would use an address which is at most 5 bits long. By placing such a limit on the size of an address, the present invention ensures that the size of a topologically encoded Internet address is no more than an address which is not so encoded (i.e., a conventional address).

Figure 2:
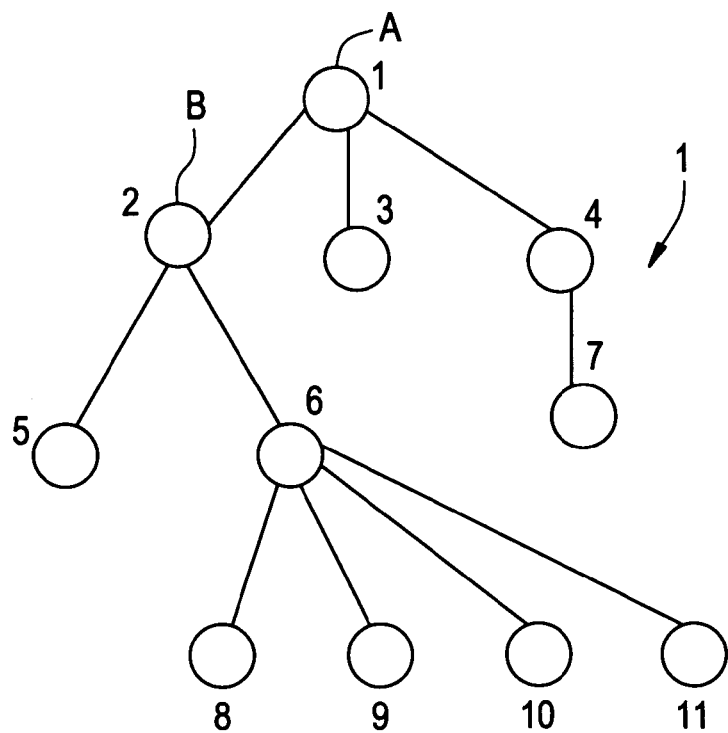
FIG. 2 depicts the nodes from FIG. 1 after they have been assigned "pre-labels" according to one embodiment of the present invention.

Referring now to FIG. 2, there is shown a simplified diagram of the nodes from FIG. 1 after they have been assigned so-called "pre-labels."

In the present example, i.e., when no Internet addresses have previously been assigned to nodes within network 1, the pre-label assigned to a first node can be arbitrarily selected. Thereafter, the other pre-labels can be assigned to the remaining nodes following rules that are adopted for a given network's design provided each is given a unique pre-label (e.g., assigning them sequentially, e.g., 1, 2, 3, 4 . . . 11).

Figure 3:
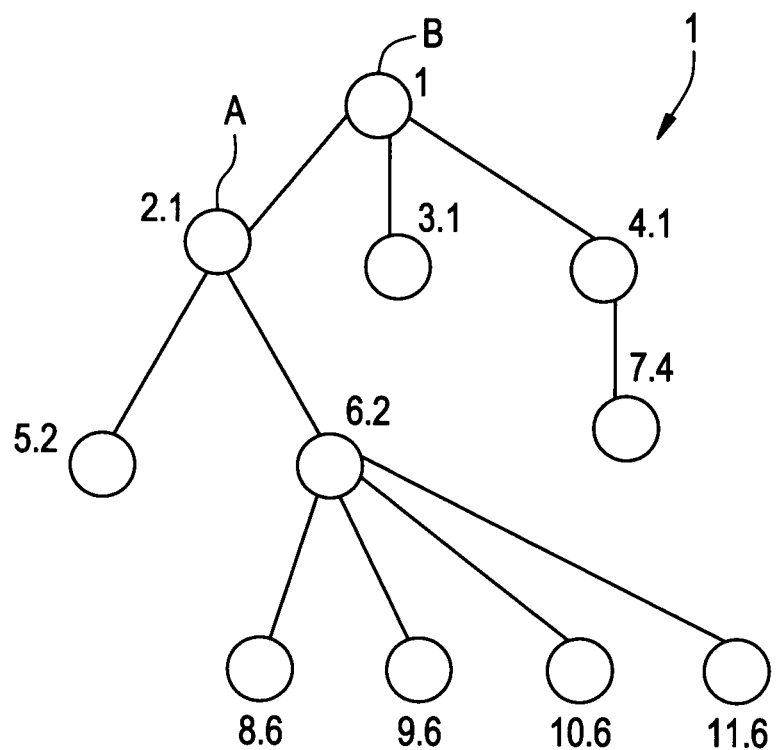
FIG. 3 depicts the nodes from FIG. 2 after they have been assigned topologically encoded Internet addresses according to one embodiment of the present invention.

In a further embodiment of the present invention, once these pre-labels have been assigned, each of the nodes may additionally be assigned a pre-label which is associated with a "parent" of a node. Together, the pre-label and parent pre-label form a topologically encoded Internet address. FIG. 3 depicts the nodes from FIG. 2 after they have been assigned an address consisting of a pre-label along with a parent pre-label. For example, the topologically encoded Internet address "2.1" assigned to node B includes the pre-label of "2" from FIG. 2 and the parent pre-label of "1" from node A in FIG. 2. Thus, it can be seen that the topologically encoded Internet address of 2.1 contains topological information which indicates that node B is linked to a parent node (in this case A) having the pre-label of 1. In general, it should be understood that to determine whether one node is adjacent to another involves comparing one portion (e.g., the second portion) of one node's address (e.g., the "1" in "2.1" of node B) with one portion (the first portion) of a second node's address (e.g., the "1" in node A) or vice-versa. If a match occurs, then the nodes are said to be adjacent.

Though in the example shown in FIG. 3 the portions to be compared are either the first or second portions of an address, this may not always be the case when an address has more than two portions. In general, it can be said that adjacency is determined by comparing a preceding portion of one node to a subsequent portion of another node (e.g., portion four is compared to portion five), or vice-versa.

One advantage of the present invention is that it is possible to determine whether two nodes are adjacent much faster that previously thought possible. More specifically, the present invention determines whether any two nodes are adjacent within a time period which is proportional to the logarithm (base 2) of the size of a network (i.e., log n, where n is the number of nodes in the network). This time period is substantially shorter than time periods required by previous techniques where the time period required to determine whether nodes are adjacent is proportional to the size of the network (e.g., if the size of a network is N, then log (N)<N). This fast adjacency determination follows from the fact that: (a) the adjacency time with respect to any two nodes, determined by looking at only a portion of each node's address bits, is proportional to the size (i.e., length) of the addresses; and (b) each size is limited to k log n bits; that is, each address' size is proportional to the logarithm of an overall network size.

Said another way, because adjacency time is proportional to address length and address length is proportional to network size, it follows that adjacency time is also proportional to network size. In this case, adjacency time is proportional to the logarithm of a network's size.

Because the present invention provides faster adjacency times, it also provides faster routing path computations. That is, because a route consists of many adjacent nodes, the faster these adjacent nodes are determined, the faster a routing path may be computed.

Figure 4:
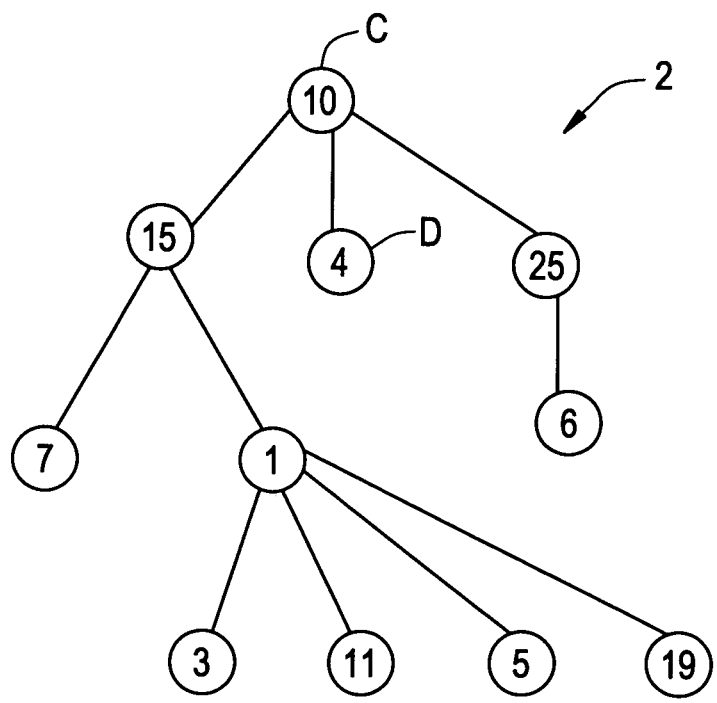
FIG. 4 depicts a network of nodes that have previously been assigned Internet addresses.

Referring now to FIG. 4, there is shown a second network 2 of nodes which have previously been assigned Internet addresses. By way of comparison, the network 1 shown in FIG. 1 was made up of nodes that had not already been assigned Internet addresses.

In one embodiment of the present invention, networks, like network 2, that have already been assigned Internet addresses may be assigned topologically, encoded Internet addresses. More specifically, the present invention provides for methods and devices which assign a topologically encoded Internet address to each node within network 2 such that each topologically encoded Internet address is no more than a constant factor larger than an original Internet address associated with a given node. As before, we start by assigning pre-labels. However, in this instance, the pre-labels are based on previously assigned Internet addresses.

Figure 5:
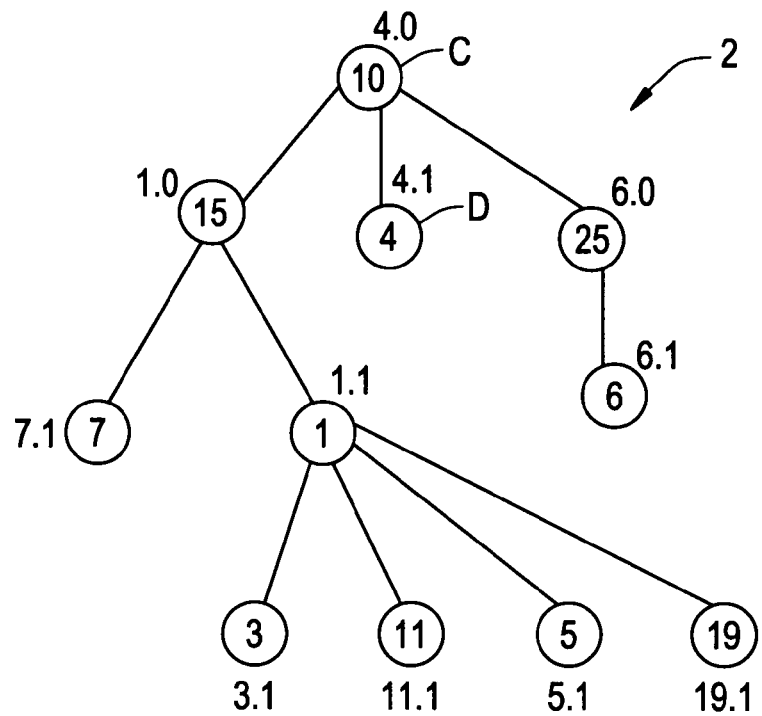
FIG. 5 depicts the nodes from FIG. 4 after they have been assigned pre-labels based on previously assigned Internet addresses according to one embodiment of the present invention.

Referring to FIG. 5, there is shown the nodes of FIG. 4 after they have been assigned pre-labels based on previously assigned Internet addresses.

In FIG. 5, the original Internet addresses are the numbers inside the circles while the initial pre-labels are represented by the numbers outside the circles. In one embodiment of the present invention, an initial pre-label may be assigned to a node as follows. For each node, a pre-label that is of the form "x.b", where x is the smallest (already assigned) address among all children of the node and itself, and where bit field b is 1 if x was the node's address or 0 if x is the address of one of its children. In this embodiment the number of bits used for any node with pre-assigned address i, is at most, log i+1.

In a further embodiment of the present invention, an additional pre-label is then combined with an initial pre-label. More specifically, this additional pre-label comprises the pre-label of a parent node. Together the parent pre-label and initial pre-label comprise a topologically encoded Internet address.

Figure 6:
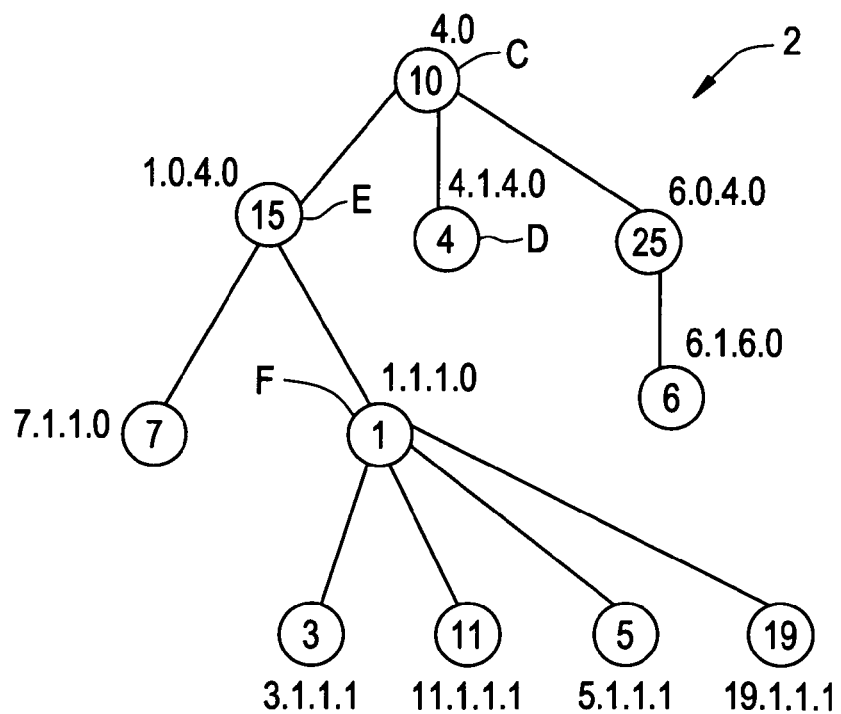
FIG. 6 depicts the nodes from FIG. 5 after they have been assigned topologically encoded Internet addresses according to still another embodiment of the present invention.

FIG. 6 depicts the nodes of FIG. 5 after each has been assigned a topologically encoded Internet address comprising an initial pre-label and parent pre-label. For example, the topologically encoded Internet address "1.0.4.0" includes the pre-label address of 1.0 and the parent pre-label of 4.0.

In accordance with an additional aspect of the present invention, each topologically encoded Internet address in FIG. 6 is made up of a number of bits, the total number of which is no more than a constant factor larger than an original Internet address. This ensures that a topologically encoded Internet address is not much larger than an original unencoded address. For example, suppose the original Internet address of 4 for node D can be represented by 4 bits. According to the present invention, the number of bits used to represent the topologically encoded Internet address assigned to node D will be some factor of 4, e.g., 8 bits. In accordance with the present invention, the constant is equal to 2. Therefore, the newly assigned address is at most twice the length of the original Internet address.

Upon so assigning topologically encoded Internet addresses to nodes within a network, the present invention additionally provides for methods and devices, such as routers or the like, for routing information from one node to another within a network using the so-assigned topologically encoded Internet addresses. For example, suppose a router located at node F, having an address of 1.1.1.0, wishes to route information to node C having an address of 4.0. In one embodiment of the invention, the router located at node F may be operable to determine if a router located at node E, having an address of 1.0.4.0, is adjacent to node C within a linear time period. Based on the addresses themselves (i.e., without having knowledge beforehand that they are linked as shown in FIG. 6), it can be seen that the router at node E includes a parent pre-label of 4.0, which indicates that it indeed is linked with node C.

At some point in time, it may be necessary to determine a shortest path or best path between a destination node and a source node. For example, a given device, such as a router, may wish to determine whether a destination node is reachable or unreachable within a certain number of hops or within a certain time frame. In a further embodiment of the present invention, the router (acting as a source node) may be operable to determine whether a destination node is reachable or unreachable within a certain number of hops using the topologically encoded Internet addresses that have been assigned to the destination node and router/source node. If and when it is determined that a destination node is not reachable within a certain number of hops, the present invention provides for methods and devices for expanding the number of hops so that the destination node may be reachable by the source node. Thereafter, information may be routed to the destination node using the expanded number of hops.

Similarly, if and when a network operator, router or a user wishes to determine the shortest distance between a source and destination node, the present invention provides for methods and devices for so determining this shortest distance using the topologically encoded Internet addresses associated with a given source and destination node.

Alternatively, the topologically encoded Internet addresses may be used to determine the routing path that is within a certain percentage of (i.e., larger than) a shortest distance. For example, if a shortest distance can be represented by 10 links, a routing path that is within 20% of this shortest path would comprise at most 12 links.

The discussion above has attempted to set forth some examples of the present invention where topologically encoded Internet addresses are assigned to given nodes of a network in order to make the computation of routing paths more scalable as the Internet grows larger and larger. The true scope of the present invention, however, is given by the claims which follow.

We claim:

1. A method for computing routing paths within the Internet comprising:
    identifying one or more nodes;
    assigning a topologically encoded Internet address, of at most a length of k log n bits, to each of the identified nodes such that any two nodes may be determined to be adjacent within a time period that is proportional to the size of the assigned addresses, where "k" is a constant and is independent of the size of a network comprising "n" nodes.

2. A method for computing routing paths within the Internet comprising:
    identifying one or more nodes;
    assigning a topologically encoded Internet address to each of the identified nodes; and
    determining whether any two identified nodes are adjacent within a time period that is proportional to the logarithm of the size of the network ("log n").

3. A method for computing routing paths within the Internet using nodes that have previously been assigned Internet addresses comprising:
    identifying on or more nodes that have previously been assigned Internet addresses
    assigning a topologically encoded Internet address to each identified node such that the encoded address assigned to each node is represented by a number of bits which is no more than a constant factor larger than a number of bits representing a previously assigned Internet address, and such that two nodes may be determined to be adjacent within a time period that is proportional to the logarithm of the size of the network.

4. The method as in claim 1 further comprising
    routing information from one node to another node using the topologically encoded Internet addresses.

5. The method as in claim 4 further comprising:
    determining whether a destination node is unreachable from a source node within a certain number of hops using the topologically encoded Internet addresses;
    expanding a neighborhood of hops when said destination node is unreachable; and
    routing information to the destination node using the expanded neighborhood of hops.

6. The method as in claim 5 further comprising determining a routing path associated with a shortest distance between the source and destination nodes using the topologically encoded Internet addresses.

7. The method as in claim 6 further comprising determining a routing path that is a distance which is within a certain percentage of a shortest distance between the source and destination nodes using the topologically encoded Internet addresses.

8. A device for computing routing paths within the Internet operable to:
    identify one or more nodes;
    assign a topologically encoded Internet address, of at most a length of k log n bits, to each of the identified nodes such that any two nodes may be determined to be adjacent within a time period that is proportional to the size of the assigned addresses, where "k" is a constant and is independent of the size of a network comprising "n" nodes.

9. A device for computing routing paths within the Internet operable to:
    identify one or more nodes;
    assign a topologically encoded Internet address to each of the identified nodes; and
    determine whether any two identified nodes are adjacent within a time period that is proportional to the logarithm of the size of the network ("log n").

10. A device for computing routing paths within the Internet using nodes that have previously been assigned Internet addresses operable to:
    identify on or more nodes that have previously been assigned Internet addresses; and
    assign a topologically encoded Internet address to each identified node such that the encoded address assigned to each node is represented by a number of bits which is no more than a constant factor larger than a number of bits representing a previously assigned Internet address, and such that two nodes may be determined to be adjacent within a time period that is proportional to the logarithm of the size of the network.

11. The device as in claim 10 where the device comprises a router.

12. The device as in claim 8 further operable to
    route information from one node to another node using the topologically encoded Internet addresses.

13. The device as in claim 12 further operable to:

determine whether a destination node is unreachable from a source node within a certain number of hops using the topologically encoded Internet addresses;

expand a neighborhood of hops when said destination node is unreachable; and route information to the destination node using the expanded neighborhood of hops.

14. The device as in claim 13 further operable to determine a routing path associated with a shortest distance between the source and destination nodes using the topologically encoded Internet addresses.

15. The device as in claim 14 further operable to determine a routing path that is a distance which is within a certain percentage of a shortest distance between the source and destination nodes using the topologically encoded Internet addresses.

16. The device as in claim 8 wherein the device comprises a router.

* * * * *